(12) United States Patent
Suzuki et al.

(10) Patent No.: US 7,746,573 B2
(45) Date of Patent: *Jun. 29, 2010

(54) BONDED OPTICAL ELEMENT AND MANUFACTURING METHOD THEREOF

(75) Inventors: Tetsuya Suzuki, Osaka (JP); Tomokazu Tokunaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 111 days.

This patent is subject to a terminal disclaimer.

(21) Appl. No.: 12/121,125

(22) Filed: May 15, 2008

(65) Prior Publication Data

US 2008/0285152 A1 Nov. 20, 2008

(30) Foreign Application Priority Data

May 18, 2007 (JP) ............................. 2007-133358

(51) Int. Cl.
*G02B 9/00* (2006.01)
*C03B 11/08* (2006.01)

(52) U.S. Cl. .......................................... 359/796; 65/39

(58) Field of Classification Search ..................... 65/37, 65/39, 64; 264/2.7; 359/708, 796
See application file for complete search history.

(56) References Cited

U.S. PATENT DOCUMENTS 5,160,361 A 11/1992 Murata et al.
6,551,530 B2 4/2003 Koizumi et al.
2007/0091472 A1* 4/2007 Alkemper et al. ........... 359/796
2007/0119212 A1 5/2007 Huang et al.
2008/0285154 A1* 11/2008 Suzuki et al. ............... 359/716

FOREIGN PATENT DOCUMENTS

| JP | 60-067118 | 4/1985 |
| JP | 10-045419 | 2/1998 |
| JP | 11-130448 | 5/1999 |
| JP | 3763552 | 1/2006 |
| JP | 2006-171164 A | 6/2006 |

OTHER PUBLICATIONS

United States Office Action issued in U.S. Appl. No. 12/121,155, dated Sep. 18, 2009.
United States Office Action issued in U.S. Appl. No. 12/121,227, dated Nov. 3, 2009.
United States Office Action issued in U.S. Appl. No. 12/121,263, dated Oct. 8, 2009.
U.S. Appl. No. 12/121,155, filed May 15, 2008.
U.S. Appl. No. 12/121,277, filed May 15, 2008.
U.S. Appl. No. 12/121,263, filed May 15, 2008.

* cited by examiner

*Primary Examiner*—David N Spector
(74) *Attorney, Agent, or Firm*—McDermott Will & Emery LLP

(57) ABSTRACT

A second optical element is bonded to a first optical element by forming the second optical element by pressing a second optical element material against the first optical element under a condition free from restriction to the second optical element material in the direction orthogonal to a direction in which the second optical element material is pressed.

11 Claims, 5 Drawing Sheets

(a)

(b)

BONDED OPTICAL ELEMENT AND MANUFACTURING METHOD THEREOF

FIELD OF THE INVENTION

The present invention relates to optical elements used for optical systems and the like, such as picture-taking lenses, optical pickups, and the like and especially relates to a bonded optical element in which optical elements different from each other are bonded to each other and a method for manufacturing it.

DESCRIPTION OF RELATED ART

Conventionally, bonded optical elements in which two or more kinds of lenses or prisms are bonded to each other are manufactured in such a manner that optical elements finished in advance by polishing (grinding), pressing, or the like are bonded to each other by means of an adhesive typified by a UV curing agent. This method, however, involves a step of manufacturing each optical element, a positioning step of arranging and positioning the two or more optical elements highly accurately, and a bonding step of applying and curing the adhesive uniformly with air void eliminated, which serve as a bar to increases in accuracy and productivity of the bonded optical elements.

For tackling this problem, there has been proposed in order to eliminate the positioning step and the bonding step methods for forming a bonded optical element by bonding by fusing glass materials.

For example, Patent Document 1 discloses a method for forming a composite optical element in which a first optical element and a second optical element material are disposed between an upper die and a lower die, and the second optical element material is pressed by the dies and the first optical element while being heated at a temperature capable of deforming the second optical element material and incapable of deforming the first element to form a second optical element, thereby integrating the first and second optical elements with each other.

Patent Document 2 proposes a method including the steps of: forming a first optical element by heating and pressing a first optical element material with the use of a pair of first and second dies and a sleeve die; taking out the second die and placing a second optical element material and a third die; and forming a second optical element by heating and pressing the second optical element material with the use of the first optical element and the third die, whereby the first and second optical elements are positioned accurately.

In addition, in order to prevent a crack caused due to a shortened cooling period from being formed, Patent Document 3 proposes a method of forming a glass lens by directly bonding glasses to each other between which the difference in linear expansion coefficient is in a range between $3 \times 10^{-7}$ and $8 \times 10^{-7}$.

Patent Document 1: Japanese Unexamined Patent Application Publication 60-67118
Patent Document 2: Japanese Unexamined Patent Application Publication 11-130448
Patent Document 3: Japanese Patent No. 3763552

SUMMARY OF THE INVENTION

Problems that the Invention is to Solve

The center thickness of an optical element rather influences the optical performance thereof and must therefore be managed highly accurately. The thickness accuracy of a bonded optical element formed by bonding two or more optical elements to each other is a sum of the thickness accuracies of the respective optical elements.

However, Patent Documents 1 to 3 are silent about the accuracy in thickness of the bonded optical element.

The thickness and the weight of each optical element of the bonded optical element may be managed more accurately than ever for highly accurately managing the thickness of the bonded optical element, which leads to an increase in cost and is therefore not preferable in mass production.

The present invention has been made in view of the foregoing and has its object of managing the center thickness of a bonded optical element highly accurately.

Means for Solving the Problems

A bonded optical element in accordance with the present invention includes a first optical element and a second optical element bonded to each other by forming the second optical element by heating and pressing against the first optical element a second optical element material, wherein the second optical element is formed by pressing the second optical element material against the first optical element under a condition free from restriction to the second optical element material in a direction orthogonal to a direction in which the second optical element material is pressed.

A bonded optical element manufacturing method in accordance with the present invention is a method for manufacturing a bonded optical element in which a first optical element and a second optical element are bonded to each other by forming the second optical element by heating and pressing against the first optical element a second optical element material, which includes the step of: forming the second optical element by pressing the second optical element material against the first optical element under a condition free from restriction to the second optical element material in a direction orthogonal to a direction in which the second optical element material is pressed.

Effects of the Invention

According to the present invention, the center thickness of the bonded optical element can be managed highly accurately with highly accurate management of the thickness and the weight of each optical element of the bonded optical element necessitated less than ever.

BRIEF DESCRIPTION OF THE DRAWINGS

FIG. 2 presents schematic sectional views showing a bonded optical element manufacturing method, wherein FIG. 2(a) shows a state in which formation of a second optical element is prepared and FIG. 2(b) shows a state in which formation of the second optical element is completed.

BEST MODE FOR CARRYING OUT THE INVENTION

An embodiment of the present invention will be described below with reference to the accompanying drawings.

Figure 1:
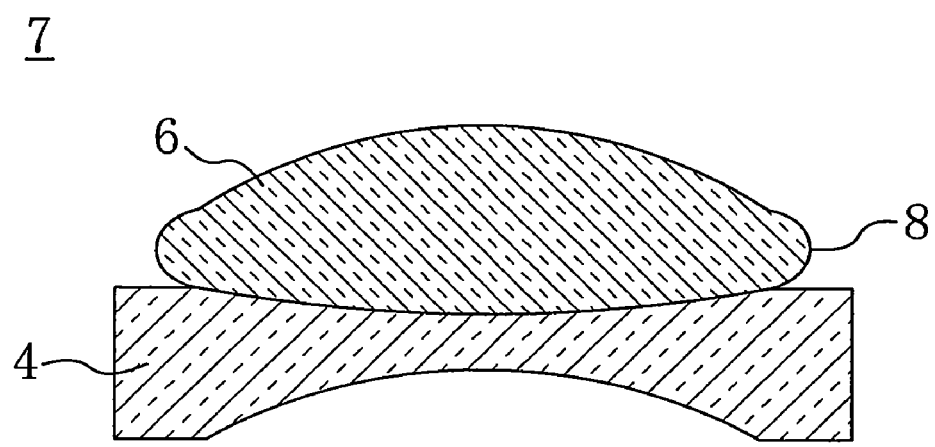
FIG. 1 is a sectional view of a bonded optical element in accordance with an embodiment of the present invention.

FIG. 1 is a sectional view of a bonded optical element 7 in accordance with the present embodiment. As shown in FIG. 1, the bonded optical element 7 includes first and second optical elements 4, 6. The first optical element 4 is a spherical biconcave lens having an outer diameter of 15 mm, a center thickness of 2 mm, and an edge thickness of 4 mm. The first optical element 4 is made of a material, PBK40 (a product by Sumida Optical Glass Inc.) having a refractive index nd of 1.51760, an Abbe number vd of 63.5, a glass transition temperature (transition temperature) Tg of 501° C., and a glass softening temperature (a flexure temperature) At of 549° C. The first optical element 4 is formed by polishing.

The second optical element 6 is bonded directly to the upper face of the first optical element 4 to be integrated therewith. The second optical element 6 is a spherical biconvex lens having an outer diameter of 12 mm, a center thickness of 4 mm, and an outer peripheral thickness of 1.5 mm. Namely, the outer diameter of the second optical element 6 is smaller than that of the first optical element 4. The second optical element 6 has a curved outer peripheral face 8 in a substantially curved form in section protruding outward in the radial direction. The second optical element 6 is made of a material, SF8 (a product by Sumida Optical Glass Inc.) having a refractive index nd of 1.68893, an Abbe number vd of 31.2, a glass transition temperature Tg of 430° C., and a glass softening temperature At of 459° C. Namely, the glass softening temperature At of the second optical element 6 is lower than the glass transition temperature Tg and the glass softening temperature At of the first optical element 4.

Figure 2:
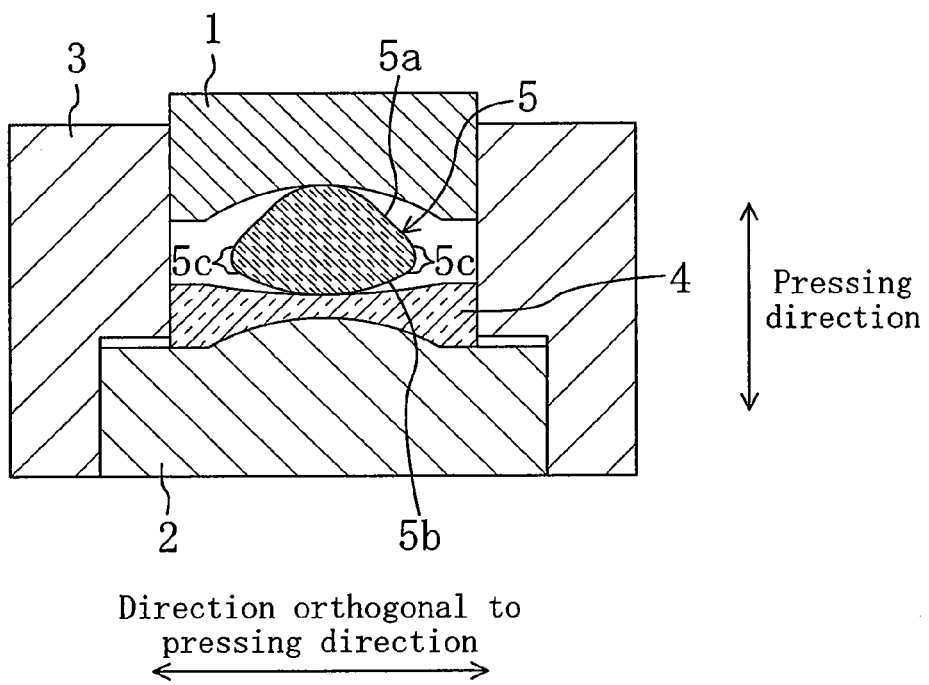
Figure 2:
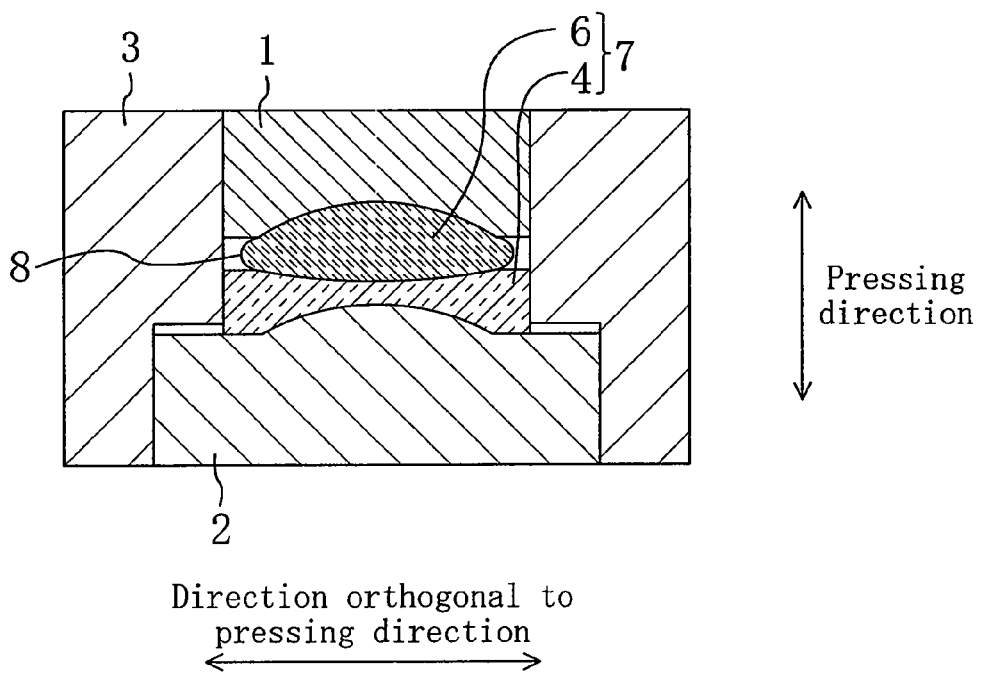

A method for manufacturing the bonded optical element 7 will be described below with reference to FIG. 2. FIG. 2 presents schematic sectional views showing the method for manufacturing the bonded optical element 7, wherein FIG. 2(a) shows a state in which formation of the second optical element is prepared and FIG. 2(b) shows a state in which formation of the second optical element is completed.

First, the first optical element 4 and a second optical element material 5 are prepared. The second optical element material 5 has, as shown in FIG. 2, a curved outer peripheral face (a side face) 5c in a substantially curved form in section protruding outward in the radial direction and is smaller in outer diameter than the first optical element 4. Next, a lower die 2 is inserted into a sleeve die 3, and the first optical element 4 is put on the lower die 2. Subsequently, the second optical element material 5 is put on the first optical element 4, and then, an upper die 1 is inserted into the sleeve die 3 so as to be placed on the second optical element material 5. When the upper die 1 and the lower die 2 are inserted into the sleeve die 3, the centers of the upper die 1 and the lower die 2 are aligned with each other.

With the use of the upper die 1, the lower die 2, and the sleeve die 3, the second optical element material 5 is pressed against the first optical element 4 under a condition free from restriction to the second optical element material 5 in the direction orthogonal to a direction in which the second optical element material 5 is pressed while being heated at a temperature incapable of deforming the first optical element 4 and capable of deforming the second optical element material 5. In other words, the second optical element material 5 is heated and pressed with the upper face 5a and the lower face 5b thereof being in contact with the upper die 1 and the first optical element 4, respectively, and with the entirety of the curved outer peripheral face 5c being out of contact with the sleeve die 3. In the present embodiment, the heating temperature is 485° C., the applied pressure is 200 kgf/cm$^2$, and the pressing period of time is 40 seconds. Thus, the second optical element 6 is formed, as shown in FIG. 2(b).

The second optical element material 5 herein is heated and pressed under a condition that its free deformation is restricted in the vertical direction, namely, toward the upper face 5a and the lower face 5b by the upper die 1 and the lower die 2 while being allowed in the horizontal direction, namely, outward from the curved outer peripheral face 5c. Whereby, the curved outer peripheral face 8 of the second optical element 6 is formed into a substantially curved form in section.

Thus, the bonded optical element 7 is formed in which the second optical element 6 is bonded to and integrated with the upper face of the first optical element 4. The thus obtained bonded optical element 7 is excellent in quality with no breakage, no crack, and no opacity.

As described above, in the present embodiment, the second optical element material 5 is pressed against the first optical element 4 under a condition free from restriction to the second optical element material 5 in the direction orthogonal to the direction in which the second optical element material 5 is pressed, thereby sufficiently absorbing variations in thickness and weight of the first and second optical elements 4, 6 to set the center thickness of the bonded optical element 7 to be almost equal to the designed value.

In consideration of variations accompanied by mass production of the bonded optical element 7, a bonded optical element was formed actually by using the first optical element 4 and the second optical element material 5 having thicknesses each being 20 μm thicker than the respective designed values. As a result, the center thickness of the thus formed bonded optical element 7 was almost equal to the designed value. Accordingly, it can be said that pressing the second optical element material 5 under a condition free from restriction to the second optical element material 5 in the horizontal direction leads to attainment of a highly accurate center thickness of the bonded optical element 7.

Further, when the second optical element material 5 is pressed with a space left between the curved outer peripheral face 5c and the sleeve die 3, the second optical element material 5 is prevented from creeping up to the upper die 1 to suppress breakage of the dies and adhesion of glass to the dies.

OTHER EMBODIMENTS

The outer diameter and the thickness of each of the first and second optical elements 4, 6 may be arbitrary values different from the values in the above embodiment. As well, the hating temperature, the applied pressure, the pressing period of time may be arbitrary values different from the values in the above embodiment.

Figure 3:
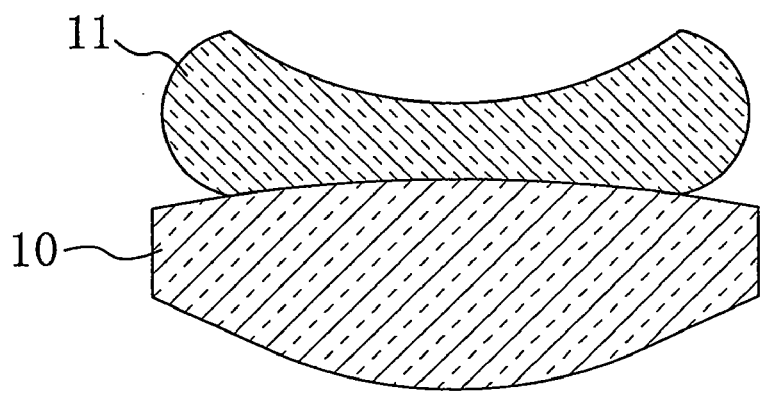
FIG. 3 is a sectional view of a bonded optical element in which a first optical element and a second optical element are a spherical biconvex lens and a spherical biconcave lens, respectively.

The first optical element 4 and the second optical element 6 are a spherical biconcave lens and a biconvex lens, respectively, in the above embodiment, but the present invention is not limited thereto and is possible that a first optical element 10 and a second optical element 11 are a spherical biconvex lens and a spherical concave lens, respectively, as shown in FIG. 3. Alternatively, one or both of the faces opposite to the bonded faces of the first and second optical elements may be aspheric.

Figure 4:
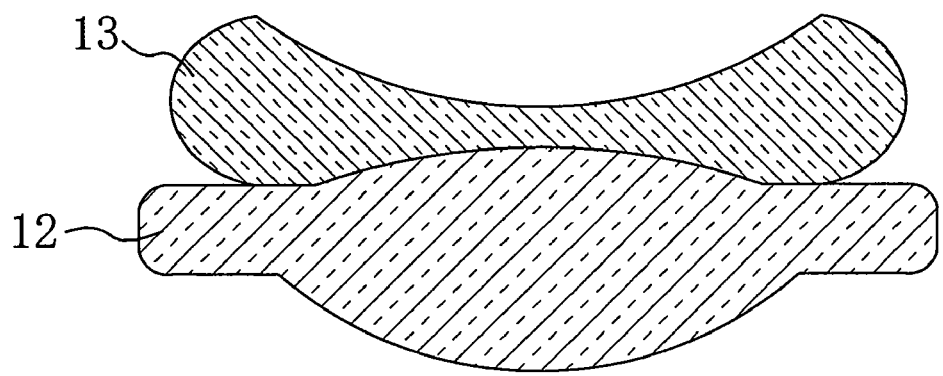
FIG. 4 is a sectional view of a bonded optical element including a first optical element formed by press forming.

The first optical element 4 is formed by polishing in the above embodiment, but the present invention is not limited thereto and a first optical element 12 may be formed by press forming, as shown in FIG. 4, for example.

Figure 5:
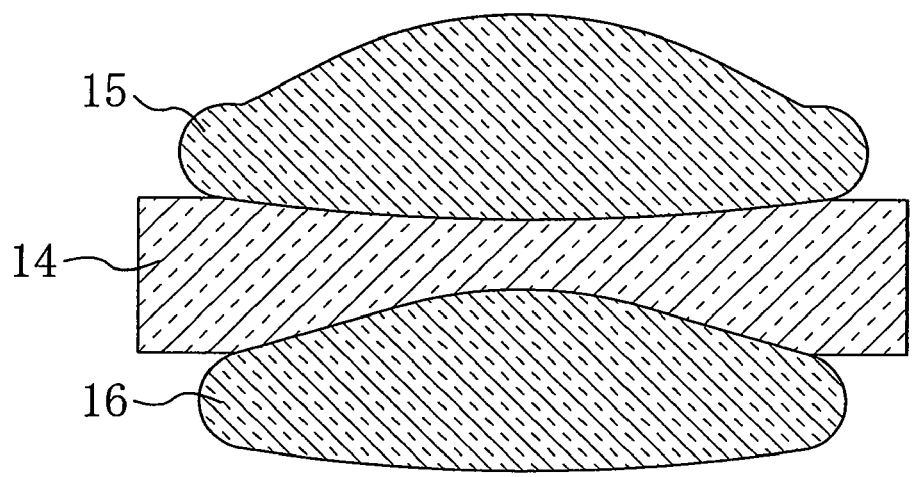
FIG. 5 is a sectional view of a bonded optical element in which a second optical element and a third optical element are bonded to and integrated with the upper face and the lower face of a first optical element, respectively.

In the above embodiment, a third optical element may be further provided which is bonded to and integrated with the first or second optical element. For example, as shown in FIG. 5, a second optical element 15 and a third optical element 16 are directly bonded to and integrated with the upper face and the lower face of a first optical element 14, respectively, by the same manner as in the above embodiment. In so doing, the second and third optical elements 15, 16 may be formed simultaneously or separately.

The first and second optical elements 4, 6 are made of the aforementioned glass materials in the above embodiment, but the present invention is not limited thereto and they may be made of glass materials different from the glass materials in the above embodiment or may be made of plastic. Wherein, the first and second optical elements 4, 6 are preferably made of glass materials. The glass-made first and second optical elements 4, 6 bring the bonded optical element 7 to have a highly accurate form, high heat resistance, high mechanical durability, and high homogeneity. The same is applicable to the aforementioned bonded optical element 7 including the third optical element.

Figure 6:
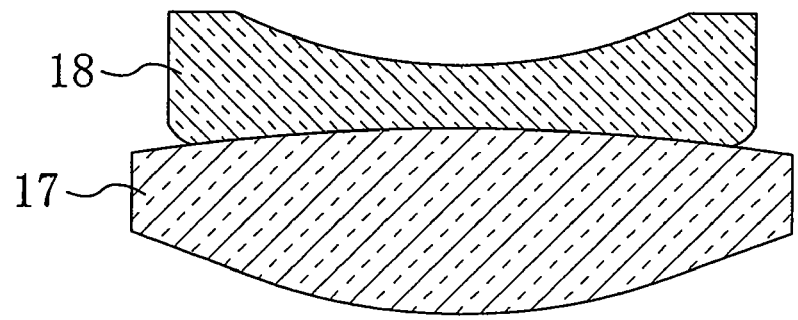
FIG. 6 is a sectional view of a bonded optical element in which only a second optical element is subjected to centering.

In the above embodiment, at least one of the optical elements may be centered after bonding and integrating the optical elements. For example, as shown in FIG. 6, after first and second optical elements 17, 18 are bonded to and integrated with each other, only the second optical element 18 may be centered. Alternatively, only the first optical element 17 may be centered or both the first and second elements 17, 18 may be centered. Centering in this way improves the eccentricity accuracy of the bonded optical element 7. The same is applicable to the aforementioned bonded optical element 7 including the third optical element.

Figure 7:
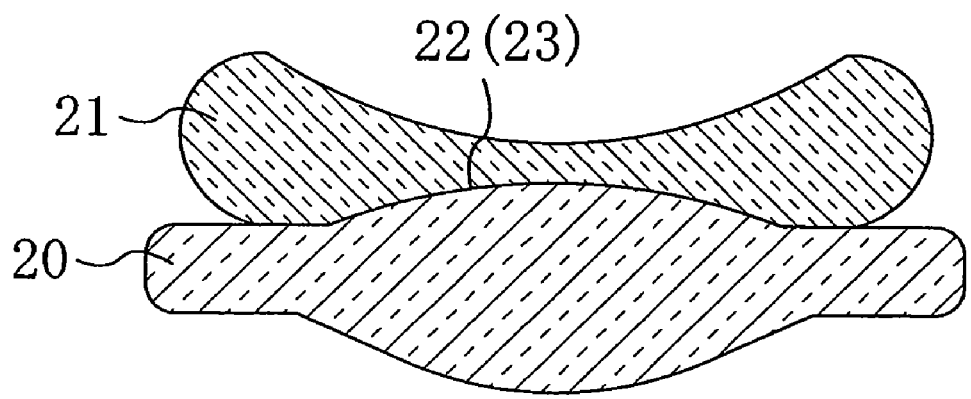
FIG. 7 is a sectional view of a bonded optical element of which lens face parts of the bonded faces are aspheric.

The first optical element 4 is a spherical lens in the above embodiment, but a lens face part (an optically functioning face) 22 of the bonded face of a first optical element 20 to a second optical element 21 may be aspheric, as shown in FIG. 7. In this case, a lens face part 23 of the bonded face of the second optical element 21 to the first optical element 21 is aspheric also. Each of the lens face parts 22, 23, which include an optically effective face, is a curved face ranging up to the upper face (the edge face) of the edge portion. When the lens face parts 22, 23 of the bonded faces of the bonded optical element 7 are set to be aspheric in this way, the degree of freedom in designing an optical system increases, thereby leading to multifunction and size reduction of an optical system. In the case where the first optical element 20 is formed by press forming herein, the lens face part 22 thereof can be easily formed so as to be aspheric. The same is applicable to the aforementioned bonded optical element 7 including the third optical element.

Furthermore, the direction in which the second optical element material is pressed agrees with the vertical direction in the above embodiment, but the present invention is not limited thereto.

The present invention is not limited to the above embodiments and can be reduced in practice in various ways without deviating from the sprit and the main subject matter of the present invention.

As described above, the above embodiments are mere examples in every aspect and must not be construed limitedly. The scope of the present invention is indicated by the attached claims and is not limited to the specification. Further, any of variations and modifications belonging to the equivalent scope of the claims fall in the scope of the present invention.

INDUSTRIAL APPLICABILITY

As described above, the present invention is applicable for the purpose of highly accurately managing the center thickness of a bonded optical element and the like.

What is claimed is:

1. A bonded optical element comprising a first optical element and a second optical element bonded to each other by forming the second optical element by heating and pressing against the first optical element a second optical element material, wherein
    the second optical element is formed by pressing the second optical element material against the first optical element under a condition free from restriction to the second optical element material in a direction orthogonal to a direction in which the second optical element material is pressed, and
    the first and second optical elements are made of glass materials.

2. The bonded optical element of claim 1, wherein
    the second optical element material is pressed against the first optical element under the condition free from restriction to the second optical element material in the direction orthogonal to the direction in which the second optical element material is pressed to cause the second optical element to have a curved outer peripheral face in a substantially curved form in section.

3. The bonded optical element of claim 1, further comprising:
    a third optical element bonded to the first or second optical element.

4. The bonded optical element of claim 1, wherein
    at least one of the optical elements is centered after the optical elements are bonded to each other.

5. The bonded optical element of claim 1, wherein
    a lens face part of a bonded face of the first optical element is aspheric.

6. A method for manufacturing a bonded optical element in which a first optical element and a second optical element are bonded to each other by forming the second optical element by heating and pressing against the first optical element a second optical element material, the method comprising the step of:
    forming the second optical element by pressing the second optical element material against the first optical element under a condition free from restriction to the second optical element material in a direction orthogonal to a direction in which the second optical element material is pressed.

7. The method of claim 6, wherein
    the second optical element is formed by pressing the second optical element material against the first optical element under the condition free from restriction to the second optical element material in the direction orthogonal to the direction in which the second optical element material is pressed to cause the second optical element to have a curved outer peripheral face in a substantially curved form in section.

8. The method of claim 6, further comprising the step of:
    bonding a third optical element to the first or second optical element.

9. The method of claim 6, comprising the step of:
    preparing glass materials as the optical element and the optical element material.

10. The method of claim 6, further comprising the step of:
    centering at least one of the optical elements after the optical elements are bonded to each other.

11. The method of claim 6, wherein
    a lens face part of a bonded face of the first optical element is aspheric.

* * * * *